May 19, 1936. R. A. BECKER, SR., ET AL 2,041,108
UNIT SOLDERLESS WIRE CONNECTER
Filed June 4, 1935
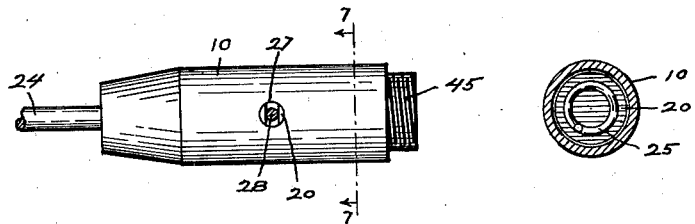
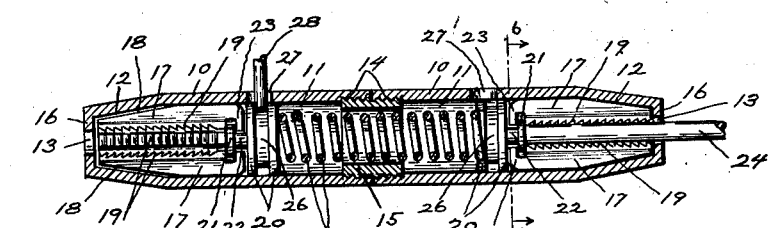
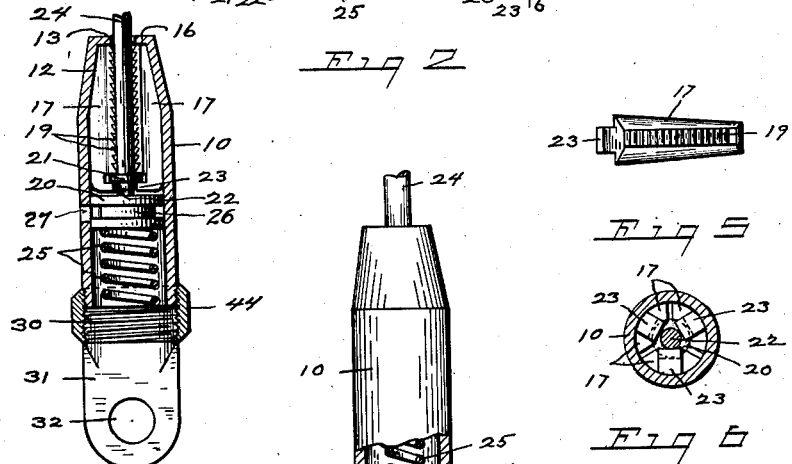
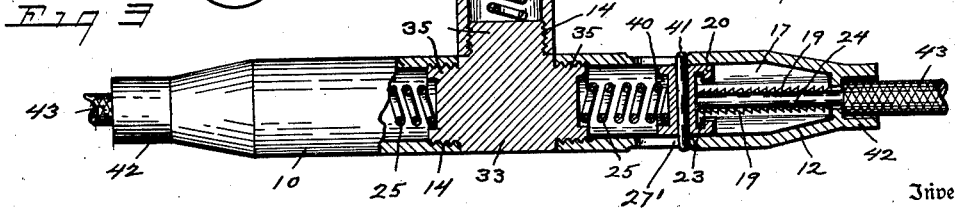
Inventors
Robert A. Becker, Sr.
Stephen P. Becker.
By John J. Thompson
Attorney Patented May 19, 1936

2,041,108

UNITED STATES PATENT OFFICE 2,041,108

UNIT SOLDERLESS WIRE CONNECTER

Robert A. Becker, Sr., and Stephen P. Becker, Poughkeepsie, N. Y.

Application June 4, 1935, Serial No. 24,810

2 Claims. (Cl. 173—303)

This invention relates to a unit solderless connecter for securely holding one or more wires together or to some other object, and the invention relates more particularly to a wire securing device in the form of a self-contained unit, of which two may be mounted together to form a splicing means for holding the abutting ends of adjacent wires together, or three units may be mounted together to provide a three wire or T-connection, or the unit may be secured in an interchangeable manner to any suitable form of mounting, such as, straps, clamps, eyes, hooks or other means for securing the unit to switch panels, outlet boxes, and other electrical installations.

We are aware that connecters have been devised for splicing wires and which employ the idea of split or chuck-jaws mounted within a casing having tapered ends for forcing the jaws into gripping contact with the wire, but in some of these devices, the casing is so constructed that the grip of the jaws upon the wire can not be released, and should a wire break off adjacent to the connecter, or the wire have to be removed, the connecter has to be discarded and can not be used again.

In other devices for this purpose, while means are provided for releasing the jaws from the wire to remove the same, they are also mounted within a casing which can not be opened or removed after once being formed over the mechanism for holding the wire, and so should any part of the internal mechanism become useless or out of place, the casing can not be opened to replace or adjust the same, and so like the other connecter it has to be discarded, with a loss of money.

We do not know of any wire connecter of the solderless type, which is so designed in the form of a self-contained unit which is capable of being secured to other identical units to form different combinations for splicing wires together, and also be interchangeable with different securing and mounting means for holding the wire to terminals, eyes, hooks, plates, and the like, for many different purposes.

The object of the invention is to provide a connecter or wire holding device which will be automatic in its action, only requiring that the end of the wire be inserted therein and which does not require the use of tools or to be soldered.

Another object of the invention is to provide a device of this kind in which the outer casing can be removed to gain access to the working parts for removal, adjustment or interchange of sizes.

Another object of the invention is to provide a device of this kind in which the internal or wire gripping parts may be interchanged to accommodate wire of different sizes without changing the size of the casing.

Another object of the invention is to provide a device of this kind in which two or more wires can be secured together in both a mechanical and electrical manner.

Another object of the invention is to provide a device of this kind in which a wire may be secured to a terminal-plate or other object by simply securing the proper connection to the unit.

Another object of the invention is to provide a device of this kind in the form of a self-contained unit which may be made up in different combinations and attached to different objects.

Another object of the invention is to provide a wire holding device which is simple, contains few parts which are also interchangeable and renewable, and which is durable, efficient, cheap, easily installed and fool-proof.

With these and other objects in view, our invention consists in certain construction and combination of parts as will hereinafter be fully described and claimed and further illustrated in the accompanying drawing which forms a part hereof and in which like figures of reference refer to corresponding parts in all of the views, and it is understood that slight changes may be made without departing from the spirit of the invention.

In the drawing:

Figure 1 is a side view of the unit connecter.

Figure 2 is a longitudinal sectional view of two of the units connected end to end to act as a wire splice, and shows one wire being held, and the other wire removed.

Figure 3 shows the unit with an attaching strap or plate secured thereto.

Figure 4 shows three units mounted together to hold three wires.

Figure 5 is a detail view of one of the gripping jaws.

Figure 6 is a cross sectional view taken on the line 6—6 of Figure 1, showing the method of mounting the jaws.

Figure 7 shows an end view of Figure 1.

Referring to the drawing:

The device consists in units which are interchangeable with each other, may be combined together, or attached to different objects and means for mounting, and this unit is composed of a tubular casing or shell 10, which may be of any desired shape in cross-section, and which is formed with the bore 11 having the inner tapered end 12 which is closed by a wall 16 provided with a wire opening 13; the other end of the shell 10 being provided with the internal threads 14.

The tapered end 12 forms a part of the mechanism for holding the wire, and within this tapered end 12 are mounted in a slidable manner the gripping jaws 17 (see Figure 5) and which are formed with a tapered outer edge 18 adapted to slide upon the taper 12, and a wire gripping edge formed with the teeth 19 similar to saw or ratchet teeth.

For holding these jaws 17 in place and for providing a means whereby they may be receded in unison to release the wire, we have provided a follower 20 slidably mounted within the bore 11 and formed with a head 21 secured upon a neck 22; and embracing this neck 22 and head 21 are the hooks 23 which are formed on the inner ends of the jaws 17, so that the follower 20 being receded or pulled back the jaws 17 will be carried with it and due to the tapers 12 and 18 the jaws will be released from the wire 24.

For retaining the jaws 17 in normally gripping relation with the wire 24, there is provided a coil spring 25 one end of which abuts the follower 20 which is formed with a cup 40 to receive the spring while the other end of the spring 25 abuts either the cupped end 40 of another unit when the same are mounted end to end as shown in Figure 2, or it abuts the end of a plug 30 as shown in Figure 3, or other mounting means.

For releasing the wire from the device, the wire is pushed inwardly to contact with the follower and carrying with it the jaws 17, disengaging them from the taper 12 and when the groove 26 of the follower registers with the hole 27 in the casing the pin 28 is inserted through the hole to engage in the groove to prevent the follower being forced outwardly by the spring 25, and thus holding the jaws free from the wire 24, which may then be removed with ease.

If desired the position of the groove 26 in the follower 20 and the hooks 23 on the jaws 17 may be reversed as shown in Figure 4, or other means may be employed for securing the follower 20 and the jaws 17 together in a floating manner.

Also in place of forming the follower 20 with the groove 26, a transverse pin 41 may be used which is secured in the follower 20 with its ends slidably mounted within the slots 27' in the casing 10 in order that the ends of the pin 41 may be engaged by the fingers to hold the follower in its jaw releasing position.

Further, the end of the casing 10 may be formed with a tubular extension 42 to embrace and protect the insulation 43 on the wire 24, or some form of cap may be employed to cover and protect the insulation.

As shown in Figure 2, a wire splice connecter is formed by securing two of these units end to end, by a threaded bushing 15 which is threaded into the internal threaded ends 14 of the casings 10, and in this case the spring 25 extends through this bushing 15 with its ends located in the cupped ends of the followers 20.

For providing for the connection of three wires, we have provided a T-member 33 having the three threaded ends 35 to which are attached by the internal threads 14, three units 10, and in this case the spring 25 is short and abuts the ends 35 and the cup in the follower 20.

As shown in Figure 3, an attachment means such as a strap 31 having a bolt hole 32 may be attached to the unit 10 by a threaded end 30, and in such a combination a short spring 25 is employed.

In some cases it may be desired to use in place of the tubular bushing connection 15, an external threaded band 44 threaded upon the outer surface of the casing 10 and this is shown in Figure 3.

It will thus be seen that by making the device in the form of a self-contained unit that these units may be employed for securely holding one or more wires either together or to other objects, and that the mechanism may be renewed and interchanged to accommodate different sizes of wire.

In place of the connecting threaded bushing 15, there may be employed the threaded plug 45 as shown in Figure 1.

Having thus described our invention, what we claim as new and desire to secure by Letters Patent, is:

1. A unit type solderless wire connecter comprising a casing formed with a tubular bore open at one end and a tapered bore communicating with the tubular bore, screw threads formed in the outer end of the tubular bore to receive a closing member, a series of jaws formed with tapered sides in contact with the tapered bore, and wire gripping faces adapted to contact with a wire, a follower slidably mounted within the tubular bore and formed with an annular groove, hooks formed on the ends of the jaws for engagement with said annular groove for attaching the jaws to the follower, a spring mounted within said tubular bore in contact with said follower and the closing member, and an opening formed in the side of said casing adjacent the annular groove in the follower.

2. In a unit type solderless connecter, a tubular casing formed with an open threaded end and a closed tapered end having a wire opening therein, said casing formed with a transverse opening in the side thereof, a series of jaw members each formed with a tapered face and a wire gripping face, said jaw members slidably mounted within said casing with their tapered faces in contact with the tapered bore of the casing, means for retaining said jaw members in operative relation with each other comprising a follower slidably mounted within said casing and flexibly connected to said jaw members and formed with an annular groove in registry with the opening in the side of the casing when the follower is moved to released position, and a resilient member mounted within said casing in pressing contact with the follower for urging the jaw members toward the tapered bore of the casing to provide a gripping action of the jaw members upon a wire.

ROBERT A. BECKER, Sr.
STEPHEN P. BECKER.